July 12, 1955

M. W. HUMPHREYS 2,712,794

FLUID MOTOR OR PUMP

Filed June 15, 1949

INVENTOR.
MARION W. HUMPHREYS
BY
Oberlin & Limbach
ATTORNEYS.

July 12, 1955     M. W. HUMPHREYS     2,712,794
FLUID MOTOR OR PUMP Filed June 15, 1949                        6 Sheets-Sheet 2

INVENTOR.
MARION W. HUMPHREYS
BY
Oberlin + Limbach
ATTORNEYS.

July 12, 1955

M. W. HUMPHREYS

2,712,794

FLUID MOTOR OR PUMP

Filed June 15, 1949

INVENTOR.
MARION W. HUMPHREYS
BY
Oberlin + Limbach
ATTORNEYS.

July 12, 1955   M. W. HUMPHREYS   2,712,794
FLUID MOTOR OR PUMP
Filed June 15, 1949   6 Sheets-Sheet 4

INVENTOR.
MARION W. HUMPHREYS
BY
Oberlin + Limbach
ATTORNEYS.

July 12, 1955 M. W. HUMPHREYS 2,712,794
FLUID MOTOR OR PUMP

Filed June 15, 1949 6 Sheets-Sheet 5

INVENTOR.
MARION W. HUMPHREYS
BY
Oberlin & Limbach
ATTORNEYS.

INVENTOR.
MARION W. HUMPHREYS
BY
Oberlin & Limbach
ATTORNEYS.

United States Patent Office 2,712,794
Patented July 12, 1955

2,712,794

FLUID MOTOR OR PUMP

Marion W. Humphreys, Euclid, Ohio

Application June 15, 1949, Serial No. 99,325

4 Claims. (Cl. 103—161)

The present invention while relating generally as indicated to a fluid motor or pump is more particularly concerned with certain improvements in a piston type pump or motor employing pistons which have rolling engagement with the actuating cam engaged thereby. Still more specifically the present invention has to do with a piston type fluid motor or pump which while retaining the advantage of simplicity of gear and vane pumps or motors with respect to the small number of different kinds of parts comprising the same has the further advantage of greater mechanical and volumetric efficiency and greater displacement per revolution for a predetermined over-all size.

In general, rotary pumps and motors of the gear and vane type require the maintenance of very close clearances between rubbing surfaces for their continued volumetric efficiency. Hitherto no satisfactory method of packing the moving surfaces to compensate for wear without sacrifice in mechanical efficiency or simplicity has been developed, but rather than attempting to solve the problem from this standpoint it is herein proposed to attack the problem from the core and provide a solution by the elimination of the rubbing surfaces insofar as possible.

Accordingly, one object of this invention is to provide a rotary pump or piston unit of the piston type having unique means for effectively controlling the passage of fluid thereinto and therefrom without bypass or leakage and without excessive resistance to free rotation of the rotatable member of the unit.

Another object is to provide, in association with a fluid motor or pump of the character referred to, novel means for controlling fluid delivery or discharge by the unit under prescribed conditions of operation and the pressure of the fluid delivered in the case of operation thereof as a pump.

Another object is to provide a floating sealing member between the relatively rotatable members of the unit carried by one member and operative to exert a controlled sealing pressure against the other member irrespective of the pressure of the fluid entering the unit or the pressure of the fluid delivered by the unit.

Another object is to provide a balanced construction in which the pistons in each of a plurality of rows are subjected to equal loads.

Another object is to provide a novel bypass means between several discharge ports of the unit whereby to enable employment thereof as a pump for driving individual hydraulic motors installed on the wheels of a motor vehicle, for example, in a manner such that the wheels may rotate at different speeds as when the vehicle is driven along a curved path and that the free rotation of one or more wheels does not preclude driving of the remaining wheels as is presently the case in conventional differential gearing drives.

Other objects and advantages will become apparent as the following description proceeds.

To the accomplishment of the foregoing and related ends, said invention, then, comprises the features hereinafter fully described and particularly pointed out in the claims, the following description and the annexed drawings setting forth in detail certain illustrative embodiments of the invention, these being indicative, however, of but a few of the various ways in which the principle of the invention may be employed.

Referring now more particularly to the drawings and first to the form of the invention illustrated in Figs. 1–8 there is shown therein a motor or pump unit comprising housing or casing parts 1 and 2 bolted or otherwise secured together and forming therebetween a chamber comprising parallel end walls 3 and 4 in the respective casing parts and a non-cylindrical cam wall or bore 5 of any desired form and hardened including a plurality of oppositely disposed and smoothly joined curves which periodically vary in radius from minimum to maximum and vice versa in uniform increments except at the points where the curves join each other, such points being smoothly joined to avoid mechanical shock in the actuation of the pistons as hereinafter explained. Thus the portions of the curves which vary uniformly with respect to the pole or axis may be sections of Archimedes spirals, for example, to provide substantially non-pulsating discharge of fluid from the unit.

Figure 1:
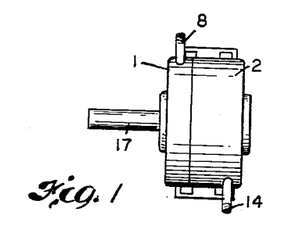
Fig. 1 is a top plan view of one embodiment of the invention.
Figure 2:
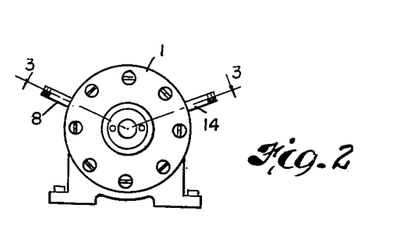
Fig. 2 is a side elevation view as viewed from the left-hand side of Fig. 1.
Figures 3, 4, 9, 10, 11:
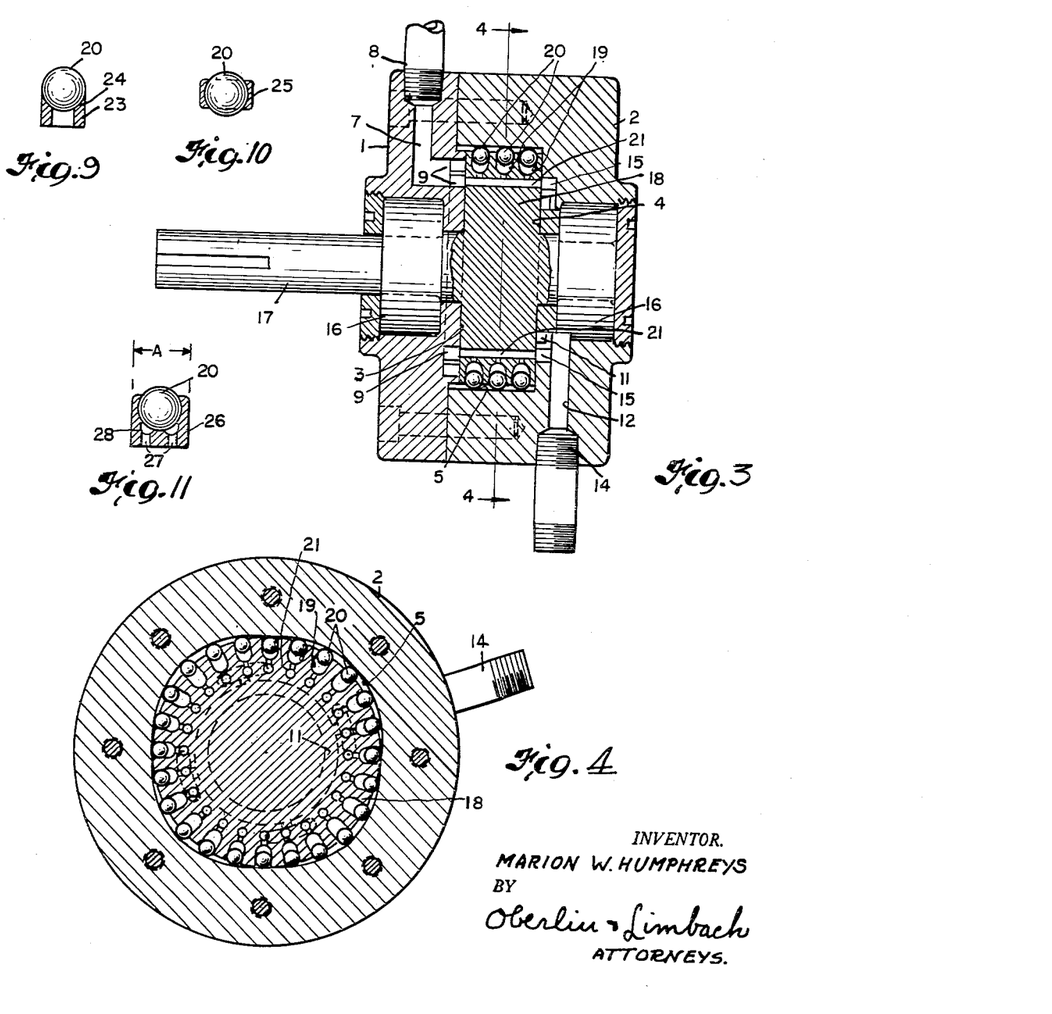
Fig. 3 is a cross-section view taken substantially along the line 3—3, Fig. 2.
Fig. 4 is a cross-section view taken substantially along the line 4—4, Fig. 3.
Figs. 9, 10 and 11 illustrate several different forms of pistons guides or followers.
Figure 5:
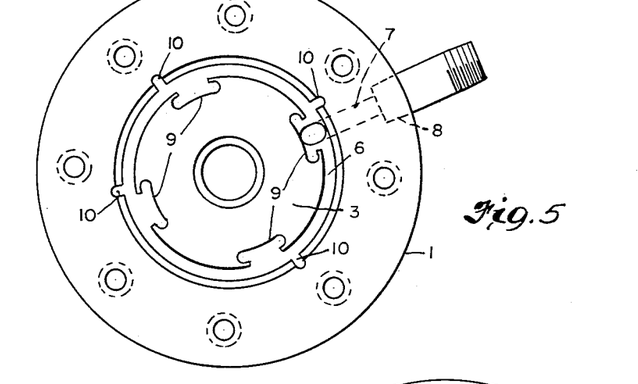
Figs. 5 and 6 are elevation views looking into the respective housing or casing parts of the unit illustrated in Figs. 1 and 2.

As best shown in Figs. 3 and 5, the end wall 3 in casing part 1 is provided with an annular recess 6 with which a fluid passage 7 leading from a port 8 communicates, such passage preferably constituting the low pressure passage, that is, the discharge passage when the unit is operated as a motor and the intake passage when the unit is operated as a pump.

Figures 6, 7, 8:
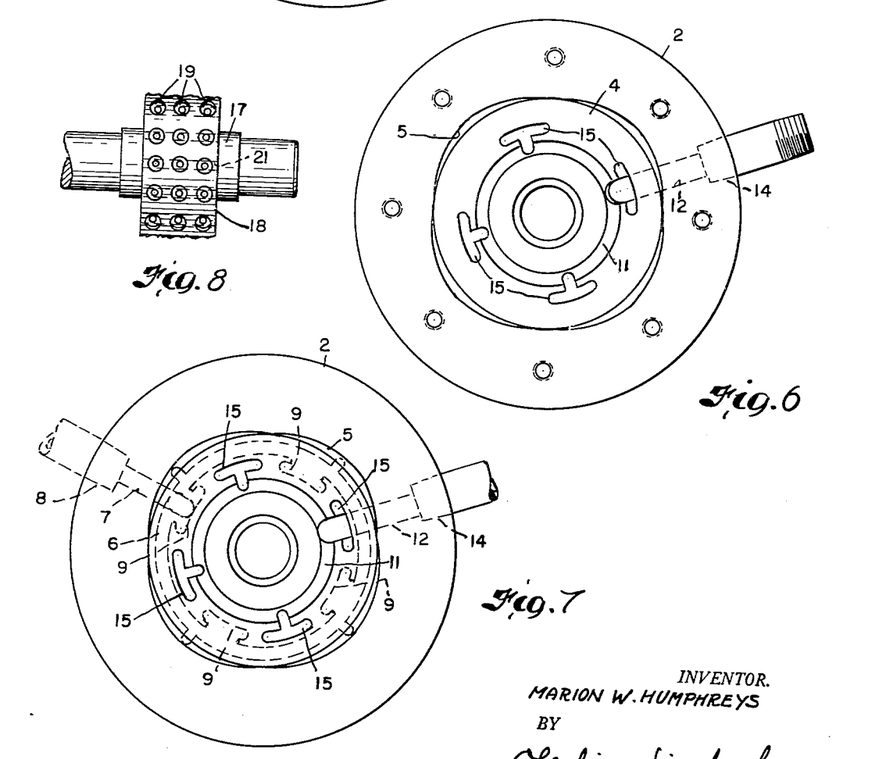
Fig. 7 is a diagrammatic elevation view similar to Fig. 6 except with the housing part illustrated in Fig. 5 superimposed thereon to show the staggered relation of the fluid inlet and discharge ports in the respective housing parts, the ports in the housing part illustrated in Fig. 5 being dotted.
Fig. 8 is a fragmentary side elevation view of the piston carrying member employed in the construction of Figs. 1–4, the pistons carried thereby having been omitted.
Figure 12:
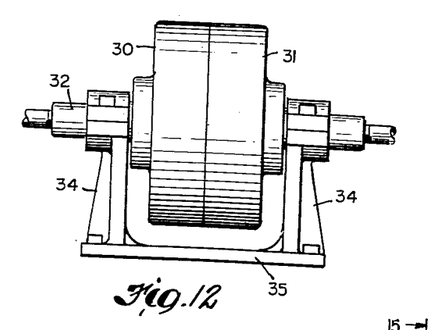
Figs. 12 and 13 are side and end elevation views of a modification.
Figure 13:
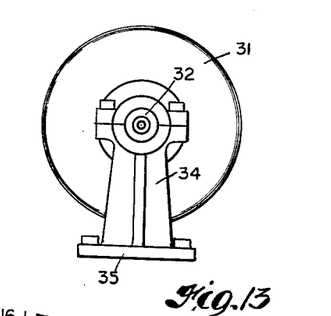
Figure 14:
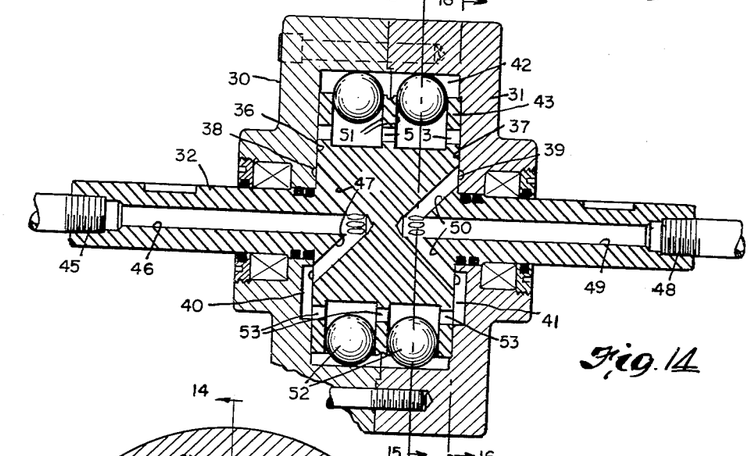
Fig. 14 is a cross-section view taken substantially along the line 14—14, Fig. 15.
Figure 15:
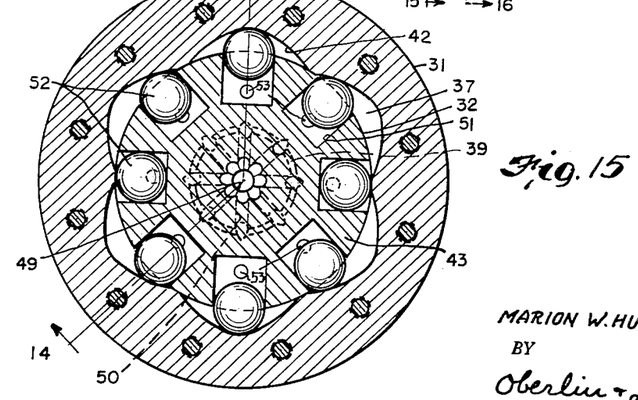
Fig. 15 is a cross-section view taken substantially along the line 15—15, Fig. 14.

Within and communicating with the recess 6, the wall 3 is formed with a plurality of uniformly spaced ports or passages 9 each of which, as is apparent from Fig. 7, extends circumferentially in a clockwise direction from a point adjacent a minimum radius portion of the cam surface 5 to a point adjacent the next maximum radius portion of the cam surface. Said wall 3 is further provided with a plurality of passages or channels 10 leading to the maximum radius portions of the cam surface 5 for the purpose of venting the fluid from these areas and thereby preventing building up of pressure therein as occasioned by leakage of fluid past the reciprocating pistons to be presently described.

Similarly, the wall 4 of casing part 2 as best shown in Figs. 3 and 6 is provided with an annular recess 11 communicating with a passage 12 and a port 14 formed in casing part 2, such wall 4 being further provided with a plurality of uniformly spaced passages or ports 15 which as viewed in Figs. 6 and 7 extend clockwise from points adjacent the maximum radius portions of the cam surface 5 to points adjacent the next minimum radius portions and are staggered midway between the similar passages 9 formed in the wall 3 of casing part 1. As shown in Fig. 7, the passages 9 and 15 are contained within coaxial circles of the same diameter whereby such passages, when translated to a common plane, define an annular passage interrupted for short distances adjacent the minimum and maximum radius portions of the cam surface 5.

Journalled, as in bearings 16 of any desired form in the respective casing parts 1 and 2 is a rotor or more properly a piston carrying member 17 having one end extending exteriorly through casing part 1 and formed with an enlarged cylindrical portion 18 intermediate its ends and disposed within the aforesaid chamber defined between casing parts 1 and 2. Said portion 18 is of diameter preferably equal to or slightly less than the minimum diameter of the cam wall 5 and of axial length such that the opposite end surfaces have a free running fit and seal with the parallel walls 3 and 4.

The outer cylindrical wall of rotor 17 as illustrated is formed with three rows of twenty-four equally spaced, radially inwardly extending bores 19, in each of which a spherical piston 20 is closely fitted for reciprocation therein, each said ball 20 being actuated by the cam surface 5 in response to rotation of the rotor 17 with respect to the casing. The inner end of each bore 19 communicates with a passage 21 extending axially through the enlarged portion 18 of the rotor, each passage 21 being common to three bores 19 as shown. Such passages 21 are circularly arranged as shown whereby on rotation of the rotor the opposite ends of each alternately register with the passages 9 and 15 in the casing parts 1 and 2. It is to be noted that the cam surface 5 is preferably formed so that at least one-half of each piston 20 always remains in its respective bore 19.

Having thus described one embodiment of this invention, reference will now be made to the operation thereof.

To operate the unit as a motor, the port 14 is connected to a source of fluid under pressure, such fluid entering the passage 12, recess 11, passages 15, certain of the passages 21 which are in register with the passages 15, and the associated bores 19 thereby forcing the associated pistons 20 radially outward into engagement with the cam surface 5, such force of the pistons 20 against the cam surface 5 setting up tangential components which cause rotation of the rotor and rolling of the pistons along the cam surface. The pistons thus urged outwardly will continue to so move until adjacent the maximum radius portions of the cam surface at which time the associated axial passages 21 will be out of register with the passages 15. As successive pistons are similarly urged outwardly and the rotor thus caused to continuously rotate, the previously actuated pistons will be forced radially inward by the cam surface 5 to discharge the fluid from the cylinders 19 through passages 21 and the passages 9 with which the last-mentioned pistons are now in register, such fluid being discharged through recess 6, passage 7 and port 8.

In the event of leakage of fluid past the pistons into the chambers surrounding the rotor 17, such fluid will be discharged through the channels 10 whereby to prevent undesirable building up of pressure in such chambers which would impede free radial outward movement of the pistons.

With the particular unit illustrated in Figs. 1–7 the pistons 20 will each move radially outwardly and inwardly four times each revolution a distance equal to the difference in the maximum and minimum radii of the cam surface 5. Accordingly, the displacement of the particular unit illustrated will be $4 \times 72 \times$ the cross-section area of bore 19 $\times$ the stroke of the piston 20. Likewise, because at least one-third of the pistons 20 are at all times working against the cam bore 5 having a radius which increases uniformly, the rotor 17 will be smoothly driven without pulsation and will have a maximum torque because the spherical pistons freely roll on the cam surface.

Moreover, it has been found that when oil or like fluid is employed, the pressure thereof retains the pistons 20 centered in the respective bores 19 whereby the pistons will freely roll within the bores with an oil film between the pistons and the bores. Actual experiments have been conducted with balls of diameter .0002" less than the diameter of the bores 19 and it has been found that under normal operating conditions, the lateral force of the balls in the bores is insufficient to break the oil film and establish electrical contact between the balls and the rotor. With such conditions, the volumetric and mechanical efficiency of the unit is much greater than obtainable with conventional gear and vane pumps. Furthermore, the entire unit essentially comprises a simple two-part casing, a one-piece rotor or piston carrying member journalled in the casing, and a plurality of identical pistons reciprocably carried by the rotor.

In operating the unit of Figs. 1–7 as a pump, the rotor 17 will, of course, be power driven and the port 8 will be the fluid intake or low pressure port and the port 14 will be the discharge or high pressure port, the operation being otherwise generally similar to the foregoing description of the operation thereof as a motor with the exception that the pistons are preferably urged radially outward by centrifugal force to draw fluid into the associated bores 19. As in the operation of the unit as a motor, the cam surface 5 is operative to force the pistons 20 radially inward to discharge the fluid from the respective bores 19 through the port 14. As before, the channels 10 will again be operative to preclude building up of pressure in the chambers surrounding the rotor.

It is to be noted that the displacement per revolution up to a certain rotor speed will automatically vary in accordance with the rotor speed, it being apparent that at very low speeds, the pistons 20 will move less than their entire strokes, outward movement being opposed by the suction in the intake side of the pump. Because of the high mechanical and volumetric efficiency of this unit a minimum driving force will be required.

It will be apparent to those skilled in the art that, if desired, springs may be employed for constantly maintaining the pistons in engagement with the cam surface 5 without relying solely on the pressure of the fluid when the unit is operated as a motor or centrifugal force when the unit is operated as a pump.

It is to be understood that instead of providing spherical pistons 20 it may be desirable in some instances to employ cylindrical pistons with their axes disposed parallel to the axis of rotation of the rotor 17. Such cylindrical pistons would obviously roll along the cam surface 5 and rotate and reciprocate transversely in the axially extending slots formed in the rotor.

In addition to providing a spherical piston 20 in each bore 19 there may be provided a tubular follower 23 as illustrated in Fig. 9 which provides a seat 24 for the piston tending to better retain the piston centered in bore 19 and thus enable the piston to roll more freely.

A further modification is to encase the piston 20 in a sleeve member 25 having its ends turned in as shown in Fig. 10.

A still further modification as illustrated in Fig. 11 comprises a cup member 26 in which the spherical piston 20 is held as by crimping of the upper edge of the cup. The bottom of the cup is formed with apertures 27 which lead to an annular recess 28 beneath the piston. Thus, when fluid under pressure acts on the area of diameter A to force the assembly radially outward of the rotor 17, the fluid entering apertures 27 and recess 28 has a counterbalancing effect and further maintains an oil film between the piston and the cup whereby the piston can freely rotate in the cup. Of course with this construction the stroke of the piston can be greater than one-half the diameter of the piston.

Figures 16, 17, 18, 21, 22, 23:
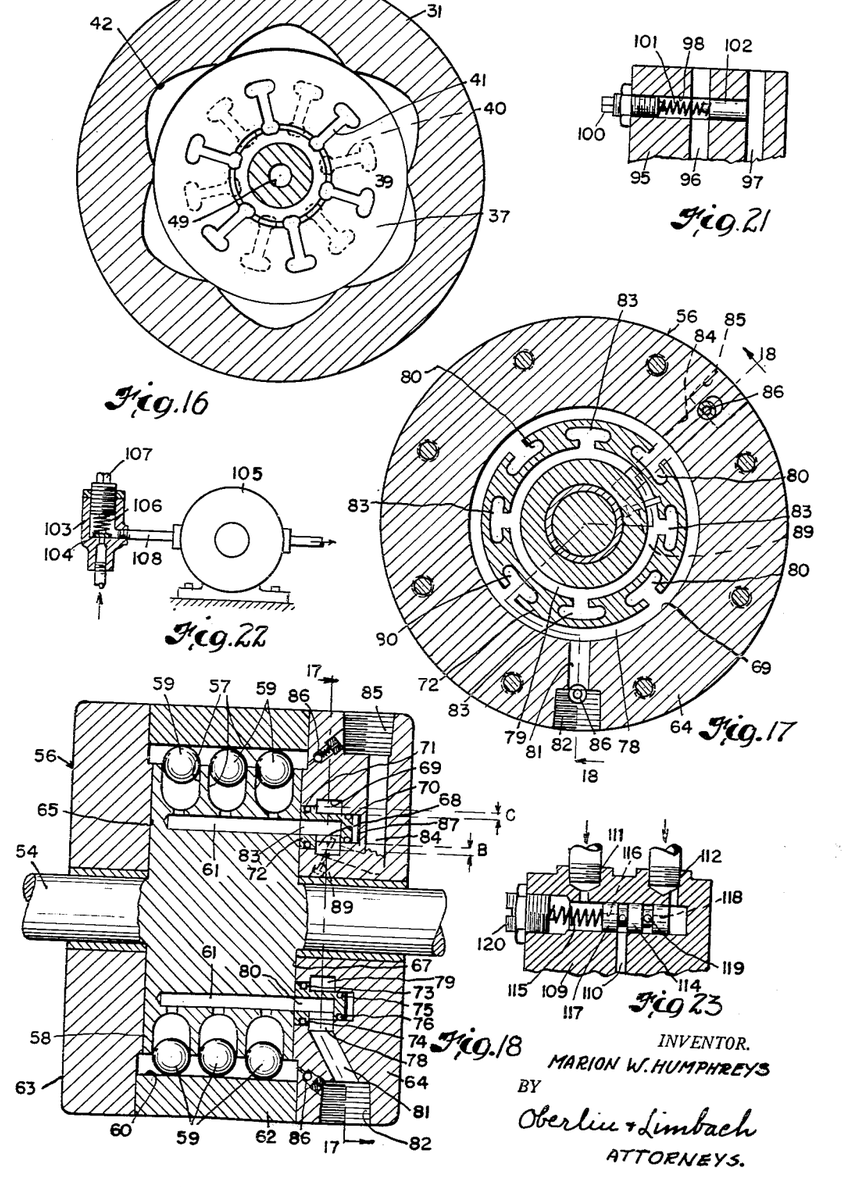
Fig. 16 is a cross-section view taken substantially along the line 16—16, Fig. 14, with the ports or passages at the opposite end of the piston carrying member dotted in to illustrate the uniformly staggered relation of the fluid inlet and discharge ports.
Fig. 17 is a cross-section view taken substantially along the line 17—17, Fig. 18, of a modification employing a floating sealing member carried by one of the relatively rotatable members of the unit and disposed in sealed contact with the other of the relatively rotatable members.
Fig. 18 is a cross-section view taken substantially along the line 18—18, Fig. 17.
Fig. 21 is a cross-section view of an accessory for any of the foregoing units for limiting the pressure delivered by the unit when the same is operated as a pump or for controlling the speed of operation of the unit when operated as a motor.
Fig. 22 is a side elevation view, partly in cross-section, illustrating another accessory for automatically varying the delivery of the unit when operated as a pump in accordance with the speed of rotation of the piston carrying member therein.
Fig. 23 is a cross-section view of another pressure responsive device for controlling the pressure or speed of the unit in the case of operation thereof as a pump or motor respectively.

Referring next to Figs. 12–16, the modification illustrated therein is basically the same as that of Figs. 1–7 except that the casing which comprises parts 30 and 31 fastened together by any suitable means rotates about a piston carrying member 32 similar to the rotor 17 but which has its opposite ends extending through the casing and non-rotatably mounted in the upstanding arms 34 of a support or base member 35. The parallel walls 36 and 37 of the chamber defined between the casing parts 30 and 31 are respectively formed with annular recesses 38 and 39 each having a plurality of radially outwardly extending passages 40 and 41 leading therefrom and opening in such walls, such passages 40 in one wall being uniformly staggered with respect to the passages 41 in the other wall as best shown in Fig. 16. Such passages 40 and 41 are disposed between the minimum and maximum radius portions of the cam surface 42 formed in part in both of the casing parts 30 and 31.

The piston carrying member 32 is formed with an enlarged cylindrical portion 43, the opposite end faces of which are closely adjacent to the walls 36 and 37 so as to establish a sliding seal therewith when the casing is rotated about said member 32.

One end of member 32 is formed with a port 45 and a passage 46 leading toward the enlarged portion and terminating in one or more passages 47 in constant communication with recess 38 and similarly the other end of member 32 is formed with a port 48 and a passage 49 leading toward the enlarged portion and terminating in one or more passages 50 in constant communication with recess 39. Obviously the ports 45 and 48 can be disposed at the same end of member 32 with the passages 46 and 49 alongside each other if desired.

The member 32 is further formed with two rows of bores 51 extending radially inward from uniformly spaced points around the cylindrical wall of the enlarged portion 43, such bores having spherical pistons 52 reciprocable therein upon rotation of the casing and engagement of the pistons with the cam surface 42 in a manner previously explained in connection with the pistons 20 and cam surface 5. Common to two pistons 52, one in each row, are a series of circularly arranged passages 53 extending axially through the enlarged portion 43 of member 32 having their opposite ends during rotation of the casing 30—31 alternately in communication with the passages 40 in wall 36 and passages 41 in wall 37.

Inasmuch as the general operation of the unit illustrated in Figs. 12–16 is the same as that of the form of unit illustrated in Figs. 1–7, repetition of such operation is not now deemed necessary except to indicate that during the outward movement of the pistons 52 by centrifugal force or by fluid under pressure the associated passages 53 will be in register with one of the passages 40 or 41 and during inward movement of the pistons by the cam surface 42 the fluid expelled from the bores 51 of the associated pistons will be discharged through the other of the passages 40 or 41.

In the embodiment of the invention illustrated in Figs. 17 and 18 the same comprises a pair of relatively rotatable members 54 and 56, herein a rotor and casing respectively, said rotor being of a construction similar to the previously described piston carrying members 17 and 32 journalled in the casing and formed with a plurality of rows of radially extending bores 57 in its enlarged cylindrical portion 58, spherical pistons 59 in such bores engageable with the cam surface 60 formed in the casing, and circularly arranged axial passages 61 common to one of the pistons in each row and terminating in openings at one end of the enlarged cylindrical portion of the rotor. The casing comprises, for example, an intermediate tubular part 62 formed with the cam bore 60 and cover plates 63 and 64 formed with spaced walls 65 and 67 in close proximity to the respective end faces of the rotor portion 58.

Instead of relying solely upon the sliding fit of the end faces of the rotor with the walls 65 and 67 as in the previously described units, end wall 67 is formed with an annular recess 68 which includes three axially adjacent concentric portions of which the middle one 69 is the largest in diameter and radial width, the inner one 70 is the smallest in diameter and radial width, and the outer one 71 closest to the end face of the rotor is of intermediate diameter and radial width.

Fitted into such recess 68 is an annular sealing member 72 including one end face adapted to make sealed contact with the juxtaposed end face of the rotor portion 58 and having sealing rings therearound such as the O-rings 73, 74, 75 and 76 dividing the recess portion 69 into two independent annular chambers 78 and 79. The sealing member 72 is formed with a plurality of uniformly spaced arcuate passages 80 which have constant communication with chamber 78 and the passage 81 and port 82 formed in cover plate 64 and with another series of arcuate passages 83 (midway between the passages 80) which have constant communication with chamber 79 and the passage 84 and port 85 also formed in cover plate 64.

The spaces between the cam wall 60 and the outer surface of the rotor portion 58 is maintained at desired low pressure by the two check valves 86 which lead from such space to ports 82 and 85 respectively. Thus, fluid under pressure in either port will hold the associated check valve in a seated position while the other port will be the low pressure port permitting unseating of the check valve associated therewith whenever the fluid pressure tends to build up in such space due to the leakage of fluid past the pistons 59 or between the rotor and casing.

As now apparent, fluid under pressure in certain of the axial passages 61 tends to move the sealing member 72 out of sealing contact with the juxtaposed end face of the rotor engaged thereby, the force in the present case being about four times the cross section of each passage 80 or 83. To counterbalance such effect, the sealing member is so formed that the annular area of radial width width B or C acted upon by fluid under pressure in either port 85 or 82 tending to force the sealing member toward the rotor is equal to the force tending to force the sealing member away from the rotor. For maintaining a desired contact pressure between the sealing member and the rotor end face a corrugated or like spring 87 is interposed between the inner end of sealing member 72 and cover plate 64. With a balanced arrangement as just described, the sealing member 72 in effect floats and the contact pressure between the sealing member and the rotor will be substantially constant no matter how great or little the fluid pressure is in either of the ports 82 or 85.

To non-rotatably support the sealing member 72 in cover plate 64 there is provided a pin or key 89 in cover plate 64 which extends into an axially disposed slot formed in the sealing member.

Having thus described another embodiment of this invention the operation thereof as a motor or as a pump will be obvious in view of the prior descriptions of the operation of the other embodiments illustrated in Figs. 1–16.

Figure 19:
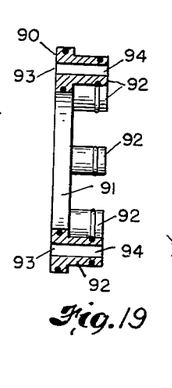
Fig. 19 is a diametrical cross-section view of a modified form of floating sealing member.
Figure 20:
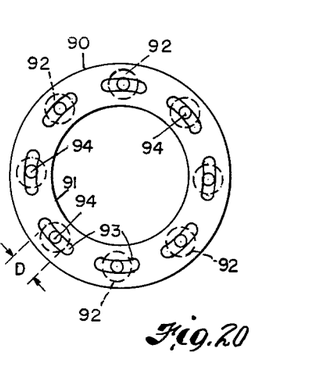
Fig. 20 is an elevation view of the sealing member illustrated in Fig. 19 as viewed from the right-hand side of the latter.

In Figs. 19 and 20 there is illustrated a modified form of floating sealing member 90 which comprises an annular portion 91 from which extends a plurality of uniformly spaced cylindrical projections 92 alternate ones of which are adapted to extend into intake and discharge bores formed in the casing, the cross-section areas D of the projections being equal to the cross-section areas of the arcuate passages 93 which fan out in the annular portion 91 from the axial, circular cross-section passages 94 through the cylindrical projections 92. It is clear that here again a uniform sealing pressure is maintained between the sealing member 90 and the rotor end face with which the same is adapted to be engaged irrespective of any variation in the fluid pressure in the unit.

With respect to pressure and volume control of the pumps or motors described, reference is now made to Fig. 21 wherein the casing 95 formed as a part of the pump or motor casing or attached thereto is formed with a passage 96 communicating with the low pressure port of the motor or pump and a passage 97 communicating with the high pressure port of the motor or pump. Intersecting passages 96 and 97 is a bore 98 in which an adjusting screw 100 is threaded to exert predetermined pressure through a spring 101 on a plunger 102 having its end exposed to pressure in passage 97. As the fluid pressure operating the motor or delivered by the pump rises, the plunger 102 will shift toward the left compressing the spring 101 and at least partially blocking the passage 96 and in this way ultimately rendering the motor or pump inoperative until the fluid pressure drops to a predetermined value.

In Fig. 22 the control comprises a valve body 103 having an adjustable spring seated valve member 104 therein which permits only a predetermined volume of fluid intake as when the unit 105 is operated as a pump. In other words, by adjusting the compression of spring 106 by manipulation of screw 107 the valve member 104 will only be unseated a predetermined distance in accordance with the speed of rotation of the piston carrying member in unit 105 (not shown) and the resulting centrifugal force of the pistons and vacuum developed in the intake line 108. Thus, at very low speeds of rotation of the piston carrying member insufficient vacuum will be developed in the line 108 to unseat said valve member 104 whereas at progressively increasing speeds the valve member will be progressively unseated to correspondingly vary the displacement of the unit 105.

In Fig. 23 there is provided a casing 109 having a passage 110 communicating with the intake port of any of the pump units illustrated, a port 111 leading to a source of fluid such as a sump (not shown) and a port 112 communicating with the high pressure port of the pump. Controlling the flow of fluid from port 111 to passage 110 is a plunger 114 which is normally held in the position shown by the spring 115 to permit free flow of fluid from port 111 to passage 110 through the axial and radial passages 116 and 117 in said plunger. However, in the event that the pressure builds up to an abnormally high value the same acting on the end of the plunger will shift the plunger toward the left as viewed in Fig. 23 against spring 115 thus closing communication between port 111 and passage 110 and establishing communication between port 112 and passage 110 through the axial and radial passages 118 and 119 in said plunger. Accordingly, continued operation of the pump will simply re-circulate the fluid therethrough and casing 109 until the delivery pressure drops sufficiently to allow the spring 115 to urge the plunger to its initial position. Adjustment of the spring is effected as by a screw 120 threaded into casing 109.

Figure 24:
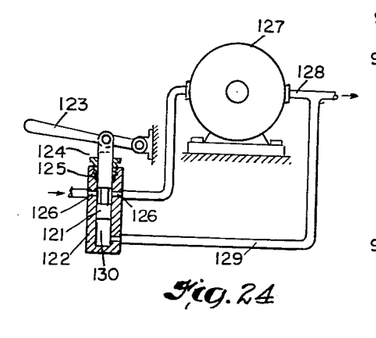
Fig. 24 is a side elevation view, partly in cross-section, of a manually settable device for controlling the delivery of the unit when operated as a pump, said device incorporating a delivery pressure responsive element which automatically cuts off or reduces the fluid intake into the unit.

A still further adjustable control is illustrated in Fig. 24 and comprises a plunger 121 shifted manually in a valve body 122 as by a pivotally mounted lever 123, said plunger being frictionally retained in adjusted position as by a gland 124 threaded in said body 122 applying pressure on a rubber or like packing 125 thereby deforming the latter into frictional gripping engagement with the plunger. In the position of the plunger shown, fluid can freely flow through the ports 126 in body 122 to the intake side of the unit 127, but upon building up of the pressure in the discharge line 128 of the unit the pressure in the branch line 129 leading to the chamber 130 in one end of said body 122 will act against the end of the plunger 121 to urge the same to a position closing or throttling the flow of fluid through the ports 126 thereby providing an automatic relief of excessive delivery from the unit 127.

As apparent, any of the above-described controls may be variously modified and may be employed with any of the pump or motor units illustrated.

Figure 25:
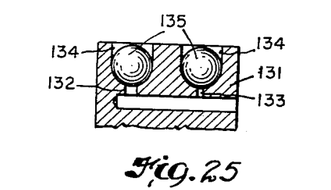
Fig. 25 is a fragmentary cross-section view of a modified form of piston carrying member which has a plurality of rows of pistons with different sizes of passages leading thereto.

A further modification as illustrated in Fig. 25 is the formation of the piston carrying member 131 with passages 132 and 133 of different sizes leading into the bores 134 for the spherical pistons 135. With such arrangement and with the sizes of the passages 132 and 133 properly selected, the operation of the unit as a pump or as a motor will cause a balancing of the forces on the pistons in each row, the pressure drop of the fluid in flowing from any bore 134 being the same as the pressure drop of the fluid in flowing from any other bore 134 by reason of the greater constriction 133 leading into the bores 134 to which the fluid otherwise has a shorter path of flow. Such balancing enhances the life of the unit and assures uniform wear of the parts thereof.

Figure 26:
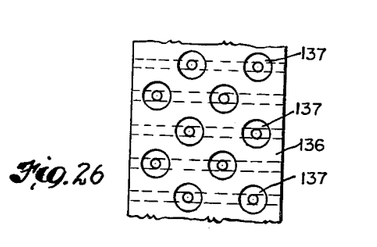
Fig. 26 is a fragmentary side elevation view of a further modification in the piston carrying member in which the cylinders or bores in which the pistons reciprocate are staggered.

In Fig. 26 is shown a further modification in the rotor or piston carrying member 136 comprising plural rows of radially disposed cylindrical bores 137 staggered as shown whereby the number of pistons in each row may be increased without correspondingly increasing the diameter of member 136 and without increasing the axial dimension of member 136.

Figure 27:
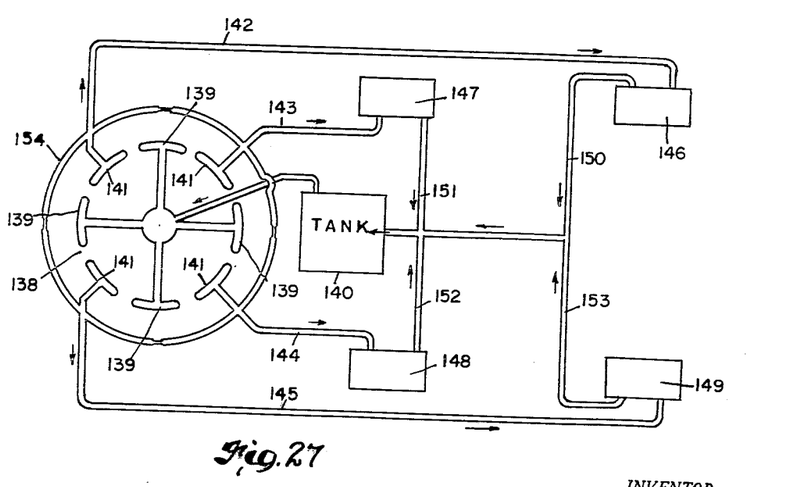
Fig. 27 is a diagrammatic illustration of the employment of the unit constituting the present invention as a pump for operating fluid motors, also preferably of the same general type, associated with the four wheels of a motor vehicle, for example, for providing a unique form of hydraulic drive.

In Fig. 27 is shown an adaptation of this invention as a hydraulic drive for motor vehicles or the like in lieu of the presently employed differential gearing, the numeral 138 referring to a schematic representation of an engine driven pump of the character previously described having intake passages 139 communicating with a fluid supply tank or reservoir 140 and separate discharge passages 141 each having a branch line 142, 143, 144, and 145 respectively connected to the intake ports of hydraulic motors 146, 147, 148, and 149 of any desired type but preferably of the same type as disclosed herein. The discharge ports of said motors are connected by way of lines 150, 151, 152, and 153 to the fluid supply tank 140. In a hydraulic drive for motor vehicles the motors 146–149 will preferably be mounted on the front and rear axles and operatively connected to the respective wheels of the vehicle.

Without more, the motors will be driven in the usual manner with fluid delivered by the pump equally to each of the motors. To enable turning of the motors at different speeds as when turning corners with the vehicle, there is provided a bypass line 154 providing a limit bypass of fluid from one pressure line to the others, such bypass line being sufficiently small that under conditions where one or more motors are operating under no load, sufficient pressure can be built up in the other lines whereby to avoid the objection to conventional differential gearing drives which prevents application of power to either of the two wheels when one is raised or is engaged with a slippery pavement.

Figures 28, 29, 30, 31, 32, 33, 34:
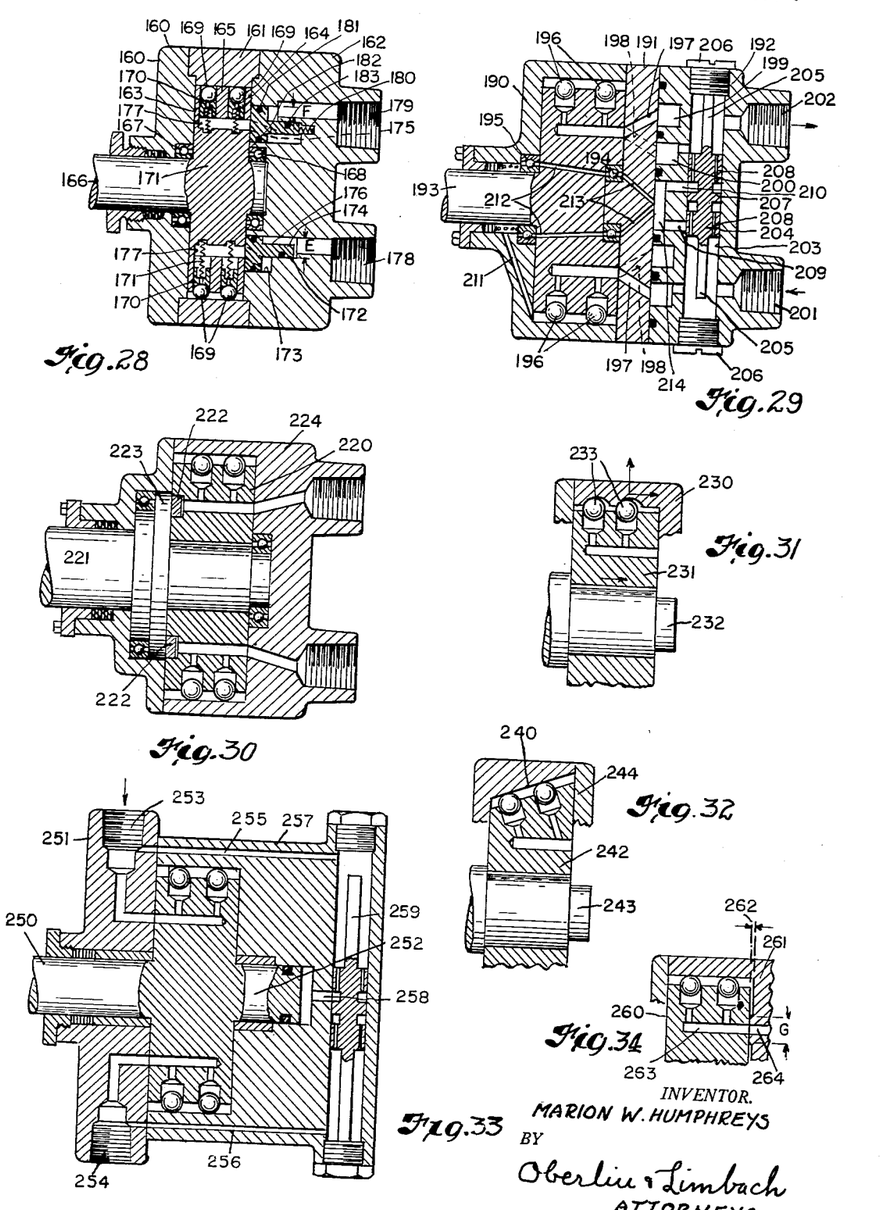
Fig. 28 is a diametrical cross-section view of a unit having a modified form of sealing member therein.
Fig. 29 is a diametrical cross-section view of a unit having valve means operative to bleed fluid through the bearings to the low pressure side of the unit.
Figs. 30–33 are cross-section views of units having floating piston carrying members or rotors which are adapted to be constantly urged into sealed engagement with the casing irrespective of the wear of the slidably engaged surfaces of the rotor and casing.
Fig. 34 is a fragmentary cross-section view of a scheme for maintaining juxtaposed faces of the rotor and casing in desired spaced relation.

In Fig. 28 the unit comprises casing parts 160, 161, and 162 defining a chamber therein including parallel end walls 163 and 164 and a cam wall 165. A piston-carrying member 166 is journalled in said casing as in bearings 167 and 168 and reciprocably mounts a plurality of radial pistons 169 which engage cam wall 165 and which are thereby actuated responsive to relative rotation of said casing and piston carrying member. In this illustrative embodiment, the pistons 169 are seated in guides or followers 170 operative in the manner of the previously described guides or followers illustrated in Figs. 9, 10, and 11.

In addition, springs 171 are provided to constantly urge the followers 170 radially outward and thus maintain the pistons 169 in constant engagement with cam wall 165. Said followers are preferably of a porous nature made as from sintered metal whereby the same will be adequately lubricated to permit operation of the unit at extraordinarily high speeds and pressures. The followers in Figs. 9–11 may similarly be fabricated from porous material for the aforesaid purposes.

The casing 162 is bored as at 172 and counterbored as at 173 to receive a sealing member 174 therein which is formed with passages 175 and 176 therethrough communicating with axial passages 177 formed in the member 166 and alternate ones of which passages 175 and 176 lead to bore 172 and port 178 and to counterbore 173 and port 179. Behind said sealing member 174 are a series of springs 180 arranged to exert a predetermined contact pressure between the juxtaposed end faces of the members 166 and 174. Said member 174 has three sealing rings 181, 182, and 183 therearound to divide the bore 172 and counterbore 173 into two separate annular chambers of radial width E and F each of cross-section area such that fluid pressure in either port 178 or 179 will counterbalance the effect of fluid pressure tending to urge sealing member 174 toward the right as viewed in Fig. 28.

The unit illustrated in Fig. 29 comprises casing parts 190, 191, and 192 forming a chamber therein in which a rotor 193 is journalled as in bearings 194 and 195, such chamber being generally of the same form as in the other forms of units previously described and said rotor carrying a plurality of spherical pistons 196 therein for reciprocation radially of the rotor responsive to relative rotation of the rotor and casing. The intermediate casing part 191 is formed with two series of passages 197 and 198 alternate ones of which respectively communicate with the annular recesses 199 and 200 formed in casing part 192. In turn the ports 201 and 202 in casing part 192 respectively lead to such recesses 199 and 200.

Slidably mounted in a cross-bore 203 in casing part 192 is a spool type valve member 204 having extensions 205 at opposite ends engageable with one or the other of the closure plugs 206. Said valve member 204 is provided with an intermediate portion 207 between apertured portions 208 whereby to afford communication between port 201 and passage 209 or between port 202 and passage 210 depending upon the position to which said valve member is urged by fluid pressure in one of said ports.

As is now apparent, fluid under pressure in port 201 will urge said valve member 204 upwardly to the position shown and fluid which may leak past the pistons 196 will be returned to the low pressure port 202 via the passage 211 in casing part 190, passages 212 in rotor 193, passages 213 in casing part 191 and chamber 214 which is common to the passages 209 and 210. On the other hand, when the port 202 is the high pressure port the valve member 204 will be shifted downwardly to bleed such leakage fluid to the other port 201. It is to be noted that because such leakage fluid flows through the bearings 194 and 195, said bearings will be adequately lubricated at all times and the temperature thereof and the central portion of the unit will be substantially the same as the temperature of the outer portions of the unit whereby to eliminate undesirable unequal thermal expansion of the parts of the unit.

Referring now to Figs. 30–33 which illustrate various schemes for effecting pressure seating of the rotor and casing, the rotors each are floatable and thus any wear between the slidably engaged valve faces of the rotor and casing is automatically taken up.

In Fig. 30 the rotor 220 is slidably keyed to shaft 221 and has a plurality of pistons 222 reciprocable in the axial bores in said rotor, said pistons being urged by fluid under pressure into engagement with the collar 223 on said shaft to thus urge said rotor toward the right and hold the end face thereof in sealed engagement with the juxtaposed face of the casing part 224.

In Fig. 31, engagement between the juxtaposed face of casing part 230 and rotor 231 slidably keyed to shaft 232 is effected by forming the cam wall engaged by the spherical pistons 233 as shown so as to set up axial force components of the radial forces acting on said pistons.

In Fig. 32 the cam wall 240 in casing part 241 is inclined with respect to the axis of rotor 242 slidably keyed on shaft 243 whereby as in Fig. 31 axial force components are set up urging said rotor toward the right with its right-hand end face in sealed engagement with the juxtaposed face of casing part 244.

In Fig. 33 the rotor 250 is urged toward the left to maintain sealed engagement with casing part 251 by fluid under pressure acting on the rotor extension 252. Fluid under pressure has access to said extension from either of the ports 253 or 254 through passages 255 or 256 in casing part 257 and passage 258, the latter being controlled by spool valve 259 which is shifted to a desired position by fluid under pressure. Said spool valve 259 is similar to the valve 204 in Fig. 29. When port 253 is the high pressure port, said spool valve 259 is forced downwardly to the position shown by fluid under pressure to establish communication from port 253 through passage 255, through said spool valve and passage 258 and when port 254 is the high pressure port said spool valve will be moved upwardly by pressure to open communication between passages 256 and 258.

Fig. 34 illustrates a preferred manner of forming the seating surfaces of the casing and rotor so as to establish a fluid-tight seal without actual metal-to-metal engagement between said parts. It has been found that when two flat pieces of metal are tightly clamped together with a film of oil therebetween the total thickness is slightly more than the sum of the thicknesses of the individual pieces when clamped together dry. Accordingly, by relieving one of the pieces a distance slightly less than the oil film thickness, the unrelieved areas will be held in spaced relation to the oil film but not far enough apart to permit any leakage. In the illustrated embodiment, rotor 260 and casing part 261 are formed with juxtaposed flat faces which it is desired to maintain in sealed relation, one of the faces (herein the face in casing part 261) being relieved as shown to a depth 262 which is on the order of .0005" or less depending upon the viscosity and other properties of the oil or other fluid to be used in the motor or pump unit. Such depth of relief 262 is selected so that it is only slightly less than the thickness of the oil film when said rotor and casing are pressed together whereby the areas G of the juxtaposed faces will be so close together that fluid cannot leak therebetween from the passages 263 and 264 but yet such areas will be held out of actual metal-to-metal contact with each other. In this way there is no appreciable friction loss due to the valving of the unit and at the same time there is no bypass or leakage through the valving to reduce the volumetric efficiency of the unit. Obviously the relief 262 may be in the seating face of the rotor 260 if desired or partially in said rotor and in said casing part.

In view of the fact that either the casing or the piston carrying member in any of the units described can rotate and that the member heretofore referred to as the casing may have the pistons mounted therein and the so-called rotor can be formed with the piston actuating cam surface, these parts or members are referred to in the ensuing claims as "relatively rotatable members."

Other modes of applying the principle of the invention may be employed, change being made as regards the details described, provided the features stated in any of the following claims, or the equivalent of such, be employed.

I therefore particularly point out and distinctly claim as my invention:

1. In combination, relatively rotatable members having juxtaposed faces in sealed, sliding engagement, one of said members carrying a plurality of cylinder and piston assemblages and formed with passages leading from the respective cylinders to such faces, and another of said members being formed with a cam for actuating the pistons during relative rotation of said members, with fluid inlet and discharge passages leading to such faces and arranged to alternately register with the passages in said one member during relative rotation of said members, and with separate annular inlet and discharge chambers radially offset with respect to said inlet and discharge passages respectively and in fluid communication therewith.

2. The combination of claim 1 wherein said annular inlet and discharge chambers are disposed around and within said inlet and discharge passages.

3. In a fluid motor or pump, the combination of a pair of relatively rotatable members, one of which is formed with an annular chamber and with fluid inlet and discharge passages respectively leading to radially spaced points in such annular chamber, a sealing member non-rotatably carried by said one member and dividing such annular chamber into two independent portions respectively communicating with such inlet and discharge passages, said sealing member being formed with a plurality of passages, some having communication with one portion of said annular chamber and others having communication with the other portion of such annular chamber, said sealing member and the other of said relatively rotatable members having juxtaposed faces in sealed, sliding contact, and said other member having a passage which alternately registers with the passages in said sealing member during relative rotation of said members, and means providing an expansible chamber communicating with the passage in said other member, said sealing member having annular areas exposed to fluid in both of said chamber portions whereby fluid under pressure in either chamber portion is effective to urge said sealing member toward and into sealed contact with the juxtaposed face of said other member.

4. The fluid motor or pump of claim 3 wherein said sealing member includes a first annular portion presenting an annular face for contact with the juxtaposed face of said other member and an annular extension of less radial extent passing through said annular chamber and presenting annular shoulders against which fluid under pressure acts in either of said chamber portions, said annular extension having radial openings communicating the plurality of passages with said chamber portions as aforesaid.

References Cited in the file of this patent

UNITED STATES PATENTS

| Number | Name | Date |
|---|---|---|
| 459,735 | Benham | Sept. 22, 1891 |
| 932,033 | Krone | Aug. 24, 1909 |
| 1,563,282 | Jessup | Nov. 24, 1925 |
| 1,649,347 | Hardt | Nov. 15, 1927 |
| 2,074,618 | Roeder | Mar. 23, 1937 |
| 2,214,119 | Brisbane et al. | Sept. 10, 1940 |
| 2,255,963 | Benedek | Sept. 16, 1941 |
| 2,273,468 | Ferris | Feb. 17, 1942 |
| 2,340,196 | Magrum et al. | Jan. 25, 1944 |
| 2,374,822 | Le Clair | May 1, 1945 |
| 2,391,221 | Beeh | Dec. 18, 1945 |
| 2,397,314 | Grosser | Mar. 26, 1946 |
| 2,423,439 | De Lancey | July 8, 1947 |
| 2,506,974 | Sorensen | May 9, 1950 |
| 2,594,662 | Leibing | Apr. 29, 1952 |
| 2,646,755 | Joy | July 28, 1953 |

FOREIGN PATENTS

| Number | Country | Date |
|---|---|---|
| 124,069 | Great Britain | 1919 |
| 587,532 | Germany | 1933 |